(12) United States Patent
Li et al.

(10) Patent No.: US 12,410,321 B2
(45) Date of Patent: Sep. 9, 2025

(54) BURNISH AND MAR RESISTANT RESIN FOR CLEAR AND PIGMENTED COATINGS

(71) Applicant: BEHR PROCESS CORPORATION, Santa Ana, CA (US)

(72) Inventors: Jigui Li, Irvine, CA (US); Christopher Ziehm, Costa Mesa, CA (US); Ryan Hicken, Tustin, CA (US); Ming-Ren Tarng, Irvine, CA (US)

(73) Assignee: Behr Process Corporation, Santa Ana, CA (US)

( * ) Notice: Subject to any disclaimer, the term of this patent is extended or adjusted under 35 U.S.C. 154(b) by 585 days.

(21) Appl. No.: 16/917,029

(22) Filed: Jun. 30, 2020

(65) Prior Publication Data

US 2021/0371671 A1    Dec. 2, 2021

Related U.S. Application Data

(63) Continuation-in-part of application No. 16/885,623, filed on May 28, 2020.

(51) Int. Cl.
| | |
|---|---|
| *C08F 220/14* | (2006.01) |
| *C08L 33/12* | (2006.01) |
| *C09D 5/00* | (2006.01) |
| *C09D 5/02* | (2006.01) |
| *C09D 133/12* | (2006.01) |

(52) U.S. Cl.
CPC ............ *C09D 5/027* (2013.01); *C08F 220/14* (2013.01); *C08L 33/12* (2013.01); *C09D 5/00* (2013.01); *C09D 133/12* (2013.01)

(58) Field of Classification Search
CPC ....... C08F 220/14; C08L 33/12; C09D 5/027; C09D 5/00; C09D 133/12
USPC ....................................................... 524/269
See application file for complete search history.

(56) References Cited

U.S. PATENT DOCUMENTS

| | | | | |
|---|---|---|---|---|
| 3,575,910 | A | * | 4/1971 | Thomas ............... C09D 133/08 524/588 |
| 5,171,638 | A | * | 12/1992 | Ozaki ................ C08F 283/124 428/447 |
| 7,604,837 | B2 | | 10/2009 | Balch et al. |
| 8,029,899 | B2 | | 10/2011 | Vijverberg et al. |
| 8,148,487 | B2 | | 4/2012 | Basil et al. |
| 8,507,631 | B2 | | 8/2013 | Basil et al. |
| 10,487,240 | B2 | | 11/2019 | Jiang et al. |

FOREIGN PATENT DOCUMENTS

| | | | |
|---|---|---|---|
| CN | 106752606 A | | 5/2017 |
| CN | 106883660 A | * | 6/2017 |
| CN | 107151503 A | | 9/2017 |
| EP | 2467431 B1 | | 4/2014 |
| EP | 3320050 A1 | | 5/2018 |
| WO | 2017007920 A1 | | 1/2017 |
| WO | 2017/192982 A1 | | 11/2017 |

OTHER PUBLICATIONS

Non-final Office Action dated Oct. 6, 2022 for U.S. Appl. No. 16/885,623, 21 pgs.
Int'l Search Report & Wrtn Opn dated Sep. 13, 2021 for PCT/US2021/034699, 64 pgs.
Final Office Action dated Apr. 11, 2023 for U.S. Appl. No. 16/885,623, 9 pgs.

\* cited by examiner

*Primary Examiner* — Kelechi C Egwim
(74) *Attorney, Agent, or Firm* — Brooks Kushman P.C.

(57) ABSTRACT

A method for forming an emulsion polymer includes a step of forming a pre-emulsion by combining a monomer composition with a siloxane-containing composition in water and polymerizing the pre-emulsion by combining the pre-emulsion with a radical initiator in a reactor to form a reaction mixture. Characteristically, the monomer composition includes one or more monomers selected from the group consisting of (meth)acrylic acid monomers, (meth)acrylic monomers, styrene monomers, vinyl acetate monomers, vinyl ester monomers, and combinations thereof. A paint composition that includes the emulsion polymer is also provided. This invention describes a method to provide excellent burnish and mar resistance while avoiding problems with film appearance that can result from siloxane addition.

20 Claims, No Drawings

BURNISH AND MAR RESISTANT RESIN FOR CLEAR AND PIGMENTED COATINGS

CROSS-REFERENCE TO RELATED APPLICATIONS

This application is a continuation-in-part of U.S. application Ser. No. 16/885,623 filed May 28, 2020, the disclosure of which is hereby incorporated in its entirety by reference herein.

TECHNICAL FIELD

In at least one aspect, the present invention is related to coating compositions that includes siloxanes.

BACKGROUND

Any discussion of the prior art throughout the specification should in no way be considered as an admission that such prior art is widely known or forms part of common general knowledge in the field.

Non-functional siloxane and functionalized siloxane are paint additives that are combined with waterborne latex polymers after polymerizations. The siloxane addition achieves improved burnish and mar resistance. While not proven, it is suspected that these siloxanes may migrate to the surface of the paint, allowing them to stratify into a slip-resistant layer on the surface of the coating and prevent undesired interactions with the substrate or paint film. This method is hypothesized because of the ability of the compounds to create surface defects in the film, making it necessary to properly disperse the siloxanes. This mixing ability of siloxane with latex polymer or paints partially depends on the hydrophobicity and hydrophilicity of the siloxane. Only water-soluble or dispersible siloxanes can be easily mixed to create a smooth latex and final paint film.

Incorporation of as-supplied siloxane causes large droplets to aggregate leading to severe orange peel and fisheyes in the final latex polymers and coatings since most siloxanes are very hydrophobic by chemistry and design. One of the approaches of reducing the above defects is to use high shear and mixing to effectively break large agglomerates of siloxane into small uniform droplets which can be stabilized and uniformly integrated as emulsions into coatings. However, this is technically difficult as there is a large potential to destroy the stability of latex emulsions and coatings.

Another method for dispersing siloxane is to use surfactants to emulsify siloxanes in water before adding them to latex polymers and coatings. However, this approach normally needs a larger level of emulsifiers. Moreover, this second approach requires an additional separate step which adds cost and time to the process.

Accordingly, there is a need for improved methods for incorporating siloxanes into polymer emulsions and paint composition.

SUMMARY

In at least one aspect, the present invention provides a method for forming a siloxane-containing resin emulsion. The method includes a step of forming a pre-emulsion by combining a monomer composition with a siloxane-containing composition in water and then polymerizing the pre-emulsion by combining the pre-emulsion with a radical initiator in a reactor to form a reaction mixture that polymerizes into an emulsion polymer. The monomer composition includes one or more monomers selected from the group consisting of (meth)acrylic acid monomers, (meth)acrylic monomers, vinyl functional monomers (e.g., styrene monomers, vinyl acetate monomers, vinyl ester monomers), and combinations thereof.

In another aspect, a method for forming a siloxane-containing resin emulsion is provided. The method includes a step of forming a pre-emulsion by combining water and a monomer composition including one or more monomers selected from the group consisting of (meth)acrylic acid monomers, (meth)acrylic monomers, styrene monomers, vinyl acetate monomers, vinyl ester monomers, and combinations thereof. The pre-emulsion is polymerized by combining the pre-emulsion with a radical initiator in a reactor to form a reaction mixture that polymerizes into an emulsion polymer. The emulsion polymer is combined in water with a first siloxane-containing emulsion to form a siloxane-containing resin emulsion. Characteristically, the first siloxane-containing emulsion includes a siloxane-containing composition.

The methods set forth herein siloxane is added into the latex polymer manufacturing. In particular, siloxanes or their derivatives are added into the monomer pre-emulsion. This processing provides the following advantages: The siloxane is effectively diluted and incorporated throughout the pre-emulsion. Most monomers used in latex polymer design are hydrophobic, so they will act as solvents to help siloxane products to disperse into the monomer pre-emulsion. The siloxane additives can be emulsified and mixed very well by the water-based monomer pre-emulsion, mainly consisting of water, monomers, and emulsifiers. Latex polymer manufacturing normally uses semi-continuous processing for quality control and reaction cooling control. This means that pre-emulsified monomers and siloxanes will be gradually added to the polymer latex reactor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Reference will now be made in detail to presently preferred compositions, embodiments, and methods of the present invention, which constitute the best modes of practicing the invention presently known to the inventors. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, —COR', —CHO, —OH, —OR', —O$^-$M$^+$, —SO$_3^-$M$^+$, —PO$_3^-$M$^+$, —CF$_2$H, —CF$_2$R', —CFH$_2$, and —CFR'R" where R', R" and R''' are C$_{1-10}$ alkyl or C$_{6-18}$ aryl groups; single letters (e.g., "n" or "o") are 1, 2, 3, 4, or 5; in the compounds disclosed herein a CH bond can be substituted with alkyl, lower alkyl, C$_{1-6}$ alkyl, C$_{6-10}$ aryl, C$_{6-10}$ heteroaryl, —NO$_2$, —NH$_2$, —N(R'R"), —N(R'R"R''')$^+$L$^-$, Cl, F, Br, —CF$_3$, —CCl$_3$, —CN, —SO$_3$H, —PO$_3$H$_2$, —COOH, —CO$_2$R', —COR', —CHO, —OH, —OR', —O$^-$M$^+$, —SO$_3^-$M$^+$, —PO$_3^-$M$^+$, —COO$^-$M$^+$, —CF$_2$H, —CF$_2$R', —CFH$_2$, and —CFR'R" where R', R" and R''' are C$_{1-10}$ alkyl or C$_{6-18}$ aryl groups; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "substantially," "generally," or "about" may be used herein to describe disclosed or claimed embodiments.

The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g., pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, composition amounts, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., CH$_2$O), values of the subscripts can be plus or minus 50 percent of the values indicated rounded to or truncated to two significant figures. For example, if CH$_2$O is indicated, a compound of formula C$_{(0.8-1.2)}$H$_{(1.6-2.4)}$O$_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

The term "one or more" means "at least one" and the term "at least one" means "one or more." The terms "one or more" and "at least one" include "plurality" as a subset.

The term "dispersant" refers to an additive that increases the stability of a suspension of powders in a liquid medium.

The term "alkyl" refers to C$_1$-20 inclusive, linear (i.e., "straight-chain"), branched, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms.

When "ene" is added after the "yl" at the end of any of the previously defined terms to form a new term, the new term refers to a diradical formed by removing one hydrogen atom from the original term of which the new term derived from. For example, an alkylene refers to a diradical group formed by removing one hydrogen atom from an alkyl group and that a "methylene" refers to a divalent radical-derived from removing one hydrogen atom from methyl. More examples of such diradicals include, but are not limited to: alkenylene, alkynylene, cycloalkylene, phenylene, heterocyclylene, heteroarylene and (nonaromatic unsaturated carbocyclylene), which are derived from alkenyl, alkynyl, cycloalkyl, phenyl, heterocyclyl, heteroaryl and (nonaromatic unsaturated carbocyclyl), respectively.

The term "methacrylate" or "acrylate" can refer to acrylate and/or methacrylate interchangeably.

The term "(meth)acrylate copolymer" means a copolymer which includes, in polymerized form, at least 80 weight percent (meth)acrylate monomers, (meth)acrylic acid monomers, styrene monomers, vinyl acetate monomers, vinyl ester monomers, or combinations thereof.

The term "(meth)acrylic acid monomer" refers to acrylic acid, methacrylic acid and substituted derivatives thereof.

The term "(meth)acrylate monomers" refers to monovinyl acrylate and methacrylate monomers. The (meth)acrylates can include esters, amides and substituted derivatives thereof. In a refinement, (meth)acrylates are $C_1$-$C_8$ alkyl acrylates and methacrylates.

The term "aromatic monomers" refers to monomers that include an a $C_{6-12}$ aryl group such as styrene.

The term "vinyl acetate monomers" refers to monomers that include a vinyl group and an acetate group such as acetic acid vinyl ester.

The term "vinyl ester monomers" refers to monomers that are esters of vinyl acetate monomers such as vinyl neodecanoate such as VeoVa™ 9, 10 and 11.

The term "residue" as used herein means that portion of a compound that remains after reaction (e.g., polymerization). In the context of the present invention, a residue is that portion of a compound remaining in the acrylic emulsion.

The term "emulsion polymer" or "emulsion" as used herein refers to a colloidal dispersion of discrete polymer particles in a liquid such as water. Sometimes herein, the term "emulsion polymer" or "emulsion" is referred to as a "resin."

The term "siloxane" means a compound having Si—O—Si linkage. As used herein, siloxane includes compounds having a single Si—O—Si linkage, as well as polysiloxanes.

Throughout this application, where publications are referenced, the disclosures of these publications in their entireties are hereby incorporated by reference into this application to more hilly describe the state of the art to which this invention pertains.

In general, aspects of the present invention provide a well-dispersed siloxane-containing emulsion. The siloxanes used herein include siloxanes with non-reactive siloxane functional groups or polysiloxanes. These siloxanes and polysiloxanes can also be functionalized with amino, hydroxyl, epoxy, vinyl, or acrylate groups (i.e., reactive groups). These reactive groups can be added in the middle of a polysiloxane chain, or the terminal ends of the polysiloxanes, to create linear polysiloxanes, branched polysiloxanes, monofunctional siloxanes, and difunctional siloxanes. These siloxanes may have one or more silane and or siloxane groups. These siloxanes can also have various alkyl groups attached to the silane, including but not limited to phenyl groups, methyl groups, and ethyl groups. These alkyl groups and other functional groups can be attached at many different points of the siloxane, including the ends, middle, and attached to multiple siloxanes. Siloxane or siloxane derivatives can be added in one of two different ways, either in pure form or emulsified form. This helps to properly disperse them throughout the film, avoiding film defects that these compounds can cause if handled improperly. In a refinement, siloxanes with functional groups can be copolymerized with the liquid monomers thereby facilitating their disposed on the emulsion polymer.

In an embodiment, a method for forming a siloxane-containing resin emulsion is provided. The method includes a step of forming a pre-emulsion by combining a monomer composition with a siloxane composition in water. The monomer composition includes one or more liquid monomers selected from the group consisting of (meth)acrylic acid monomers, (meth)acrylic monomers, styrene monomers, vinyl acetate monomers, vinyl ester monomers, and combinations thereof. Characteristically, these monomers are liquids at 25° C. The pre-emulsion is then polymerized by combining the pre-emulsion with a radical initiator in a reactor to form a reaction mixture. When the siloxane composition includes siloxane having functional groups such as —NH$_2$, OH, —R$_4$—OH (R$_4$ is a $C_{1-10}$ alkenylene group), —R$_4$—NH$_2$ (R$_4$ is a $C_{1-10}$ alkenylene group), epoxy group, vinyl group, or acetate group, the siloxanes can be copolymerized with the monomers in the monomer composition. Advantageously, the siloxane-containing resin emulsion provided burnish and mar resistance in finished coatings formed from paint composition that include the siloxane-containing emulsion.

In another embodiment, a method for forming a coating with burnish and mar resistance is provided. The method includes a step of forming a pre-emulsion by combining water and one or more monomers selected from the group consisting of (meth)acrylic acid monomers, (meth)acrylic monomers, styrene monomers, vinyl functional monomers (e.g., vinyl acetate monomers, vinyl ester monomers), and combinations thereof. The pre-emulsion is polymerized by combining the pre-emulsion with a radical initiator in a reactor to form a reaction mixture that polymerizes into an emulsion polymer. The emulsion polymer is first combined in water with a siloxane-containing emulsion to form a siloxane-containing resin emulsion. Characteristically, the first siloxane-containing emulsion includes a siloxane-containing composition. Advantageously, polymers made from the siloxane-containing resin emulsion provided burnish and mar resistance in finished coatings formed from paint composition that include a product of the siloxane-containing emulsion.

Examples of suitable siloxanes that can be used in any of the methods set forth herein are provided by formulae 1, 2, and 3:

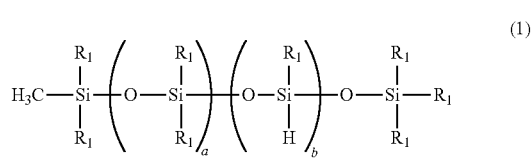

(1)

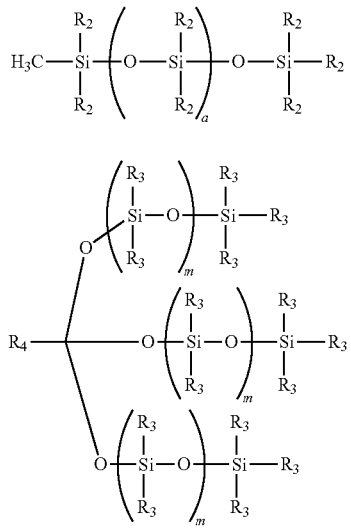

wherein:

a, b, and m are each independently 0 to 100, need not be an integer as to describe an average structure. $R_1$, $R_2$, $R_3$ are each independently $C_{1-10}$ alkyl, $C_{6-14}$ aryl, $C_{6-15}$ heteroaryl, —$NH_2$, OH, —$R_4$—OH (i.e, an alcohol group), —$R_4$—$NH_2$ (i.e, an amine group), epoxy group, vinyl group, or acrylate group; and $R_4$ is a $C_{1-10}$ alkenylene group. In a refinement, each of the $R_1$, $R_2$, $R_3$ are each independently hydrogen, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, allenyl, or other alkyl groups or chains. It should be appreciated that the $R_1$ on different silicon atoms of the same molecule need not be the same, $R_2$ on different silicon atoms of the same molecule need not be the same, and $R_3$ on different silicon atoms of the same molecule need not be the same. More specific siloxanes are provided by formula 4, 5, 6, 7, and 8:

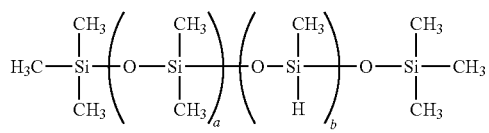

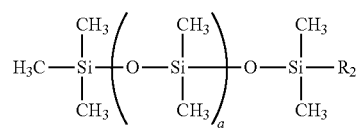

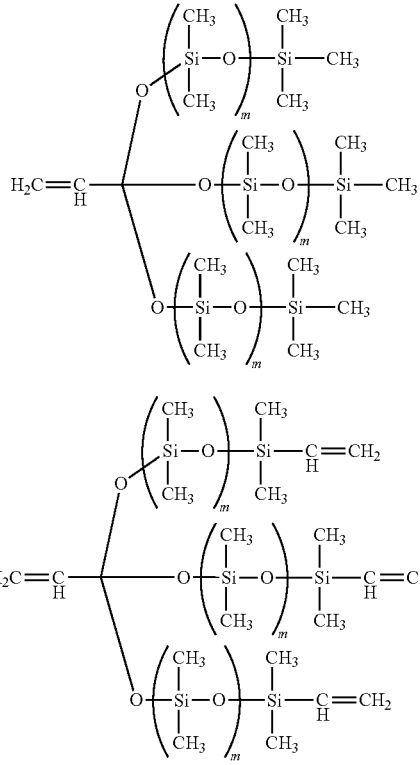

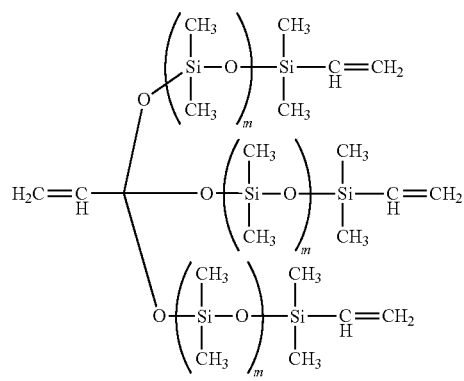

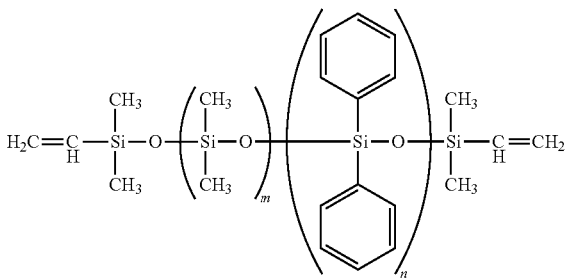

wherein a, b, m, and n are each independently 0 to 100 (need not be an integer as to describe an average structure). Examples of such siloxane-containing materials include, but are not limited to, BYK's Silclean 3700, Silclean 3701, Silclean 3710, Silclean 3720, Siltech's Silmer® OH series, Siltech's OHT series, Siltech's ACR series, Siltech's OH ACR series, Siltech's NH series, Siltech's EP(C) series, Siltech's VN series, Siltech's TMS series, as well as functional silicones commercially available from Gelest, Inc.

In one variation, the step of polymerizing the pre-emulsion in each of the embodiments includes a seeding step in which a portion of the pre-emulsion and a predetermined amount of initiator are added to the reaction mixture and allowed to react for a first predetermined time period at a first predetermined temperature. In a refinement, the first predetermined time period is from about 2 minutes to 2 hours and the first predetermined temperature from about 70° C. to about 100° C. In this variation, an additional amount of the pre-emulsion and the radical initiator is added to the reaction mixture over a second predetermined time period at a second predetermined temperature with mixing.

In a refinement, the second predetermined time period is from about 1 hour to 10 hours, and the second predetermined temperature from about 70° C. to about 100° C. A chaser is then added to the reaction mixture at a third predetermined temperature over a third predetermined time period. The polymerization is then allowed to complete over a third predetermined time period. The chaser can potentially scavenge any unreacted monomer. In a refinement, the third period of time is from about 2 minutes to 2 hours and the third temperature from about 40° C. to about 70° C. After the mixture is allowed to cool (typically to room temperature), a neutralizing agent (e.g., ammonia) and optional additional additives can be added to the reaction mixture.

As set forth above, the emulsion polymerization is initiated by radical initiators that generate free radicals upon exposure to heat or light, which initiate polymerization. The radical initiator can be a water-soluble initiator or an oil-soluble initiator. Water-soluble initiators are preferred. Suitable water-soluble radical initiators include, but are not limited to, persulfates (e.g., potassium persulfate, ammonium persulfate, sodium persulfate, and mixtures thereof), oxidation-reduction initiators, and combinations thereof. The oxidation-reduction initiator can be the reaction product of persulfates (e.g., potassium persulfate, ammonium persulfate, sodium persulfate, and mixtures thereof) and reducing agents. Examples of reducing agents include sodium metabisulfite and sodium bisulfite; and 4,4'-azobis(4-cyanopentanoic acid) and its soluble salts (e.g., sodium, potassium). Suitable oil-soluble radical initiators include, but are not limited to, azo-compounds such as 2,2'-azobis(isobutyronitrile)) and 2,2'-azobis(2,4-dimethylpentanenitrile. Additional radical initiators can be organic peroxides, metal iodides, and metal alkyls, and combinations thereof. Moreover, the radical initiators set forth herein can also be used for the chaser. It should be appreciated that each of the combinations of the initiators set forth above can also be used.

As set forth above, the monomers include (meth)acrylic acid monomers and (meth)acrylic monomers. The (meth)acrylic acid monomers include acrylic acid, methacrylic acid and substituted derivatives thereof. Examples of the (meth)acrylic monomers include, but are not limited to, methyl acrylate, methyl methacrylate, ethyl acrylate, ethyl methacrylate, butyl acrylate, butyl methacrylate, 2-ethylhexyl acrylate, decyl acrylate, lauryl methacrylate, methyl methacrylate, butyl methacrylate, stearyl methacrylate, isobornyl methacrylate, cyclohexyl methacrylate, isodecyl methacrylate, lauryl methacrylate, hydroxyethyl methacrylate, hydroxypropyl methacrylate, and combinations thereof. In a refinement, the monomer composition includes butyl acrylate, ethyl hexyl acrylate, methyl methacrylate, acrylic acid, and methacrylic acid.

A "final siloxane-containing resin emulsion" as used herein refers to a composition that includes all of the components that have been added to the reaction mixture of the methods set forth herein including the neutralizing agent and any additives set forth herein. In a variation, the final siloxane-containing resin emulsion includes the monomer and polymer composition in an amount from about 25 to 65 weight percent of the final siloxane-containing resin emulsion, the siloxane-containing composition in an amount from about 0.05 to 25 weight percent of the total weight of the final siloxane-containing resin emulsion, and the radical initiator in an amount from about 0.05 to 2 weight percent of the total weight of the final siloxane-containing resin emulsion with the balance being water. In a refinement, the chaser is present in an amount from about 0.05 to 2 weight percent of the total weight of the final siloxane-containing resin emulsion. In a further refinement, the neutralizer is present in an amount of about 0.05 to 5 weight percent of the total weight of the final siloxane-containing resin emulsion. In a further refinement, the biocide is present in an amount of 0.01-0.40 percent of the total weight of the final siloxane-containing resin emulsion. In still a further refinement, a surfactant is present in an amount from 0.5 to 5 weight percent of the total weight of the final siloxane-containing resin emulsion.

In another embodiment, an acrylic emulsion formed by the methods set forth above is provided. The acrylic emulsion includes water, an acrylic polymer or copolymer, and siloxane composition residues (i.e., siloxane residues). The acrylic polymer or copolymer includes residues of the one or more monomers set forth above. In a refinement, the siloxane composition residues are incorporated into the acrylic polymer or copolymer. In another refinement, the siloxane composition residues are dispersed in water along with the acrylic polymer or copolymer. Typically, siloxane composition residues are present in an amount from 0.5% to 25% of the weight of the first acrylic polymer or copolymer. Characteristically, the acrylic polymer or copolymer is formed by polymerizing the monomer compositions set forth above. Consistent with the methods set forth above, the acrylic emulsion can include the adhesion promoter, the defoamer, the biocide, the initiator, the chaser, and the neutralizing agent, or residues of each of these components. Details of the siloxane composition, the siloxane composition, and all other components of the acrylic emulsion are the same as set forth above.

In another embodiment, a paint composition that includes the siloxane-containing emulsion set forth above is provided. In addition to the siloxane-containing emulsion, the paint composition can include a pigment composition. In a refinement, the pigment composition is a solvent acrylic-based colorant. In another refinement, the pigment compositions include a dye or pigment in a solvent system. Examples of such solvent systems include nonionic and anionic dispersing and wetting agents and polyglycol. Specific useful pigment compositions are the Chromaflo Chroma-Chem Pigment Dispersions from Chromaflo Technologies (e.g., 1852 Transparent Yellow Oxide, 1054 Transparent Red Oxide, 9956 Carbon Black, 2075 Raw Umber, 5558 Phthalo Green Blue, etc.), Other useful pigments include dispersions of carbon black. Typically, the pigment composition is present in an amount of at least 0, 0.1, 0.5, 1, or 2 weight percent and at most 10, 7, 6, 5, or 4 weight percent of the total weight of the paint composition.

In a variation, the paint composition includes titanium oxide in an about from about 1 to 50 weight percent of the total weight of the paint composition.

In a variation, the paint compositions set forth herein include a mildewcide. Typically, the mildewcide is present in an amount from about 1 to 4 weight percent of the total weight of the paint composition. In a refinement, the mildewcide is present in an amount from about 1 to 3 weight percent of the total weight of the paint composition. In another refinement, the mildewcide is present in an amount from about 1.5 to 2.5 weight percent of the total weight of the paint composition. An example of a useful mildewcide is 3-iodo-2-propynyl butylcarbamate ("IPBC").

In typical applications, the paint composition can include one or more additives in relatively low amounts in order to provide important properties to the paint composition. Typical additives include rheology modifiers, surfactants, suspending agents, defoamers, organic solvents, dispersants, coalescents, light stabilizers (e.g., Hindered amine light stabilizer such as Tinuvin® 292), biocides and combinations thereof. In a variation, the additives are collectively present in an amount from about 0.1 to 20 weight percent. In a refinement, the additives are collectively present in an amount from about 1 to 20 weight percent. It should be appreciated that other well-known additives can be utilized to provide additional properties. In a refinement, each of the following additives are independently optionally present in an amount greater than 0.01, 0.05, 1.0, 2.0, 3.0 or 4.0 weight percent of the total weight of the paint composition and in an amount less than, 20.0, 15.0, 10.0, 9.0, 8.0, 7.0, or 6.0 weight present of the total weight of the paint composition: rheology modifiers, surfactants, defoamers, organic solvents, dispersants, coalescents, light stabilizers, and biocides.

In a variation, the paint composition set forth above are made by a two-step process—the grind and the letdown. In the grind step, the solvent (water), dispersant, defoamer, and pigments are mixed together. In the letdown step, the siloxane-containing emulsion, the mildewcide, if present, the rheology modifier, if present, and the biocide, if present, are added to the grind product.

The following examples illustrate the various embodiments of the present invention. Those skilled in the art will recognize many variations that are within the spirit of the present invention and scope of the claims.

Resin Formula 1—Conventional Latex

Table 1 provides the amount of material used for a conventional emulsion.

TABLE 1

Conventional resin emulsion composition

| Reactor Charge |
|---|
| 175 g Water |
| 3 g Solvay Rhodacal ® A246 MBA |
| 1 g Sodium Carbonate |
| Pre-emulsion |
| 200 g Water |
| 3 g Solvay Rhodacal ® A246 MBA |
| 1 g Sodium Carbonate |
| 200 g Butyl Acrylate |
| 250 g Methyl Methacrylate |
| 15 g Acrylic Acid |
| Initiator |
| 50 g Water |
| 1 g Sodium Persulfate |
| Chaser |
| 20 g Water |
| 2 g t-butyl Hydroperoxide |
| Chaser |
| 20 g Water |
| 2 g Bruggolite ® FF6M |
| Neutralizer |
| 3 g Sodium Carbonate |
| Biocide |
| 2 g Acticide MBS 2550 |

The following procedure is followed for forming the conventional resin emulsion composition. Add all components of the reactor charge to a sealed reactor kettle flushed with nitrogen. Stir while pre-emulsion is prepared. To prepare pre-emulsion, mix water, surfactant, and sodium carbonate at 150 rpm for 10 minutes until everything is dissolved and homogenous. Turn the mixer speed up to 500 rpm and add the remaining components. Once all components have been added, stir pre-emulsion for 30 minutes to ensure stable emulsification. Prepare initiator by dissolving persulfate in water, and load into a syringe pump connected to the reactor. Heat reactor charge to 80° C. while stirring and then feed in 5% pre-emulsion. Wait for the kettle to reach 80° C. again and then add 5% initiator solution to seed the latex. Allow reactor to exotherm, and fully react over ~15 minutes or until the temperature stabilizes after the exotherm. Increase temperature to 85° C. Feed pre-emulsion at a steady rate over 4 hours while simultaneously feeding in initiator over 4.5 hours. After feeding, hold the reactor at temperature for 30 minutes and then cool reactor to 45-55° C. Dissolve chaser feeds separately into water and load into separate syringes. Add syringes to a syringe pump connected to the reactor. Feed chaser solutions simultaneously into the reactor for 20 minutes at 45-55° C. Hold reaction at temperature for 20 minutes after the chaser solution feeding. Cool to room temperature and add neutralizer and biocide. Filter the latex, using a 150 micron filter, into a container for storage.

Resin Formula 1A-C—Conventional Latex Post-Modification

In a variation of Resin formula 1, the latex is taken and reacted post-synthetically to a chemically compatible siloxane that will react with exposed groups on the latex. This can possibly form a siloxane shell around the polymer. The following procedure is followed for forming this conventional resin emulsion composition:

Resin Formula 1A

To 100 g of Resin 1, add 2 g of Silmer® EP Di-50 and stir for 5 minutes. Allow to sit overnight before testing or using to allow the epoxy siloxane to react with the latex.

Resin Formula 1B

To 100 g of Resin 1, add 2 g of Silmer® NH C50 and stir for 5 minutes. Allow to sit overnight before testing or using to allow the amino siloxane to react with the latex.

Resin Formula 1C

To 100 g of Resin 1, add 2 g of Silclean 3700 and stir for 5 minutes. Allow to sit overnight before testing or using to allow the alcohol siloxane to react with the latex.

Resin Formula 2—Emulsified Siloxane

Siloxane emulsification for addition to later stage latex is formed from the composition of Table 2.

TABLE 2

Siloxane post-emulsification resin composition

| Reactor Charge |
|---|
| 170 g Water |
| 3 g Solvay Rhodacal ® A246 MBA |
| 1 g Sodium Carbonate |
| Pre-emulsion |
| 200 g Water |
| 3 g Solvay Rhodacal ® A246 MBA |
| 1 g Sodium Carbonate |
| 200 g Butyl Acrylate |
| 250 g Methyl Methacrylate |
| 15 g Acrylic Acid |
| Initiator |
| 50 g Water |
| 1 g Sodium Persulfate |

TABLE 2-continued

Siloxane post-emulsification resin composition

Chaser 20 g Water
2 g t-Butyl Hydroperoxide
Chaser 20 g Water
2 g Bruggoliteg ® FF6M
Siloxane Solution 10 g Water
5 g Silmer ® EP Di-50
5 g Solvay Rhodacal ® A246 MBA
Neutralizer 3 g Sodium Carbonate
Biocide 2 g Acticide MBS 2550

The following procedure is followed for forming the siloxane post-emulsification resin composition. Add all components of the reactor charge to a sealed reactor kettle flushed with nitrogen. Stir while pre-emulsion is prepared. To prepare pre-emulsion, mix water, surfactant, and sodium carbonate at 150 rpm for 10 minutes until everything is dissolved and homogenous. Turn the mixer speed up to 500 rpm and add the remaining components. Once all components have been added, stir pre-emulsion for 30 minutes to ensure stable emulsification. Prepare initiator by dissolving persulfate in water, and load into a syringe pump connected to the reactor. Heat reactor charge to 80° C. while stirring and then feed in 5% pre-emulsion. Wait for the kettle to reach 80° C. again and then add 5% initiator solution to seed the latex. Allow reactor to exotherm, and fully react over ~15 minutes or until the temperature stabilizes after the exotherm. Increase temperature to 85° C. Feed pre-emulsion at a steady rate over 4 hours while simultaneously feeding in initiator over 4.5 hours. After feeding, hold the reactor at temperature for 30 minutes and then cool reactor to 45-55° C. Dissolve chaser feeds separately into water and load into separate syringes. Add syringes to a syringe pump connected to the reactor. Feed chaser solutions simultaneously into the reactor for 20 minutes at 45-55° C. Hold reaction at temperature for 20 minutes after chaser feeding. Meanwhile in a separate container, emulsify all components of siloxane mixture with a stirrer at 500 rpm for 30 minutes. Then, add the siloxane solution to the reactor and mix for 10 minutes. Cool to room temperature and add neutralizer and biocide. Filter the latex, using a 150 micron filter, into a container for storage.

Resin Formula 3—Pure Siloxane Addition into the Monomer Pre-Emulsion

Table 3 provides the amount of material used for the siloxane-containing emulsion.

TABLE 3

Siloxane-containing emulsion resin composition

Reactor Charge 170 g Water
3 g Solvay Rhodacal ® A246 MBA
1 g Sodium Carbonate

TABLE 3-continued

Siloxane-containing emulsion resin composition

Pre-emulsion 200 g Water
3 g Solvay Rhodacal ® A246 MBA
1 g Sodium Carbonate
200 g Butyl Acrylate
250 g Methyl Methacrylate
5 g Silmere ® EP Di-50
15 g Acrylic Acid
Initiator 50 g Water
1 g Sodium Persulfate
Chaser 20 g Water
2 g t-Butyl Hydroperoxide
Chaser 20 g Water
2 g Bruggolite ® FF6M
Neutralizer 3 g Sodium Carbonate
Biocide 2 g Acticide MBS 2550

The following procedure is followed for forming the siloxane-containing emulsion resin composition. Add all components of the reactor charge to a sealed reactor kettle flushed with nitrogen. Stir while pre-emulsion is prepared. To prepare pre-emulsion, mix water, surfactant, and sodium carbonate at 150 rpm for 10 minutes until everything is dissolved and homogenous. Turn the mixer speed up to 500 rpm and add the remaining components. Once all components have been added, stir pre-emulsion for 30 minutes to ensure stable emulsification. Prepare initiator by dissolving persulfate in water, and load into a syringe pump connected to the reactor. Heat reactor charge to 80° C. while stirring and then feed in 5% pre-emulsion. Wait for the kettle to reach 80° C. again and then add 5% initiator solution to seed the latex. Allow reactor to exotherm, and fully react over ~15 minutes or until the temperature stabilizes after the exotherm. Increase temperature to 85° C. Feed pre-emulsion at a steady rate over 4 hours while simultaneously feeding in initiator over 4.5 hours. After feeding, hold the reactor at temperature for 30 minutes and then cool reactor to 45-55° C. Dissolve chaser feeds separately into water and load into separate syringes. Add syringes to a syringe pump connected to the reactor. Feed chaser solutions simultaneously into reactor for 20 minutes at 45-55° C. Hold reaction at temperature for 20 minutes. Cool to room temperature and add neutralizer and biocide. Filter the latex, using a 150 micron filter, into a container for storage.

Incorporation of the siloxane into the latex can demonstrate increased burnish and mar resistance, but first needs to be tested for uniform film formation from the following testing method:

For resin film appearance check, a 3 mil drawdown is prepared on a Leneta 3B chart. The panel is then allowed to air dry overnight and is then observed by the following criteria. Orange peel: this term refers to a wavy appearance occurring throughout the paint film. This is due to the thickness varying due to the coating's surface interactions. Fisheyes refer to a phenomenon where the coating develops scattered holes where no coating is present, and only the substrate is observed. The severity here is judged based on the number and size of the fisheyes, with less/smaller holes being less severe than many large holes.

TABLE 4

Resin wet and dry film appearance studies of different siloxane incorporation methods in neat resin

|  | Wet Film | | Dry Film | |
| --- | --- | --- | --- | --- |
|  | Fisheyes | Orange Peel | Fisheyes | Orange Peel |
| Resin 1 | None | None | None | None |
| Resin 1A | Many | Severe | Many | Severe |
| Resin 1B | Many | Severe | Many | Severe |
| Resin 1C | Many | Severe | Many | Severe |
| Resin 2 | Some | Some | Some | Some |
| Resin 3 | None | Slight | None | None |

The conventional resin, resin 1, showed the best film appearance. Post-addition of siloxane into finished latex, 1A-1C, resulted in the most severe fisheyes and orange peel. Post-addition of emulsified siloxane emulsification, resin 2, resulted in fewer defects compared to 1A-1C. Addition into the monomer pre-emulsion, resin 3, showed the best results for film appearance when incorporating siloxane. It can be seen that the order addition of siloxane products is very critical for the development of a defect-free resin film and its application in either clear or pigmented coatings.

The investigation into how these three different siloxane addition methods influence the film appearance for architectural coatings was evaluated in a flat white and semi-gloss deep color paint formulations.

White Color Flat Paint Formula

The following procedure is followed for forming the white color flat paint formula: The mill container is mixed at high speed with pigment grinding blade capable of high shearing. Starting with water, add each ingredient in the listed order, allowing 5 minutes to mix between ingredients, then 30 minutes at the end to fully disperse pigments (Table 5). Following this, transfer ingredients to letdown container (Table 6), and continue to add the rest of the ingredients in order while stirring. Stir for 20 minutes before removing paint from the letdown. Let sit 30 minutes before testing.

TABLE 5

Mill Composition

| Mill | |
| --- | --- |
| Water | 35 g |
| TiO$_2$ Slurry with 76% solids | 290 g |
| Sodium Carbonate | 3.5 g |
| BYK Optiflo T1000 (thickener) | 8 g |
| Dow Tamol ™ 2011 (dispersant) | 5 g |
| Dow Tamol ™ 165A (dispersant) | 1 g |
| Silicone Defoamer | 1 g |
| Minex ® 4 (filler) | 45 g |
| Minex ® 10 (filler) | 105 g |
| Zinc Omadine ® (zinc pyrithione dispersion) | 2 g |
| Water | 35 g |

TABLE 6

Letdown Composition

| Letdown | |
| --- | --- |
| Resin | 400 g |
| Silicone Defoamer | 0.5 g |

TABLE 6-continued

Letdown Composition

| Letdown | |
| --- | --- |
| Ashland Natrosol ™ Plus 330 | 0.75 g |
| Eastman Velate ™ 368 (coalescent) | 10 g |
| Proxel ® AQ (preservative) | 3.5 g |
| Dow Acrysol ™ RM-8W (Rheology Modifier) | 6 g |

Deep Color Semi-Gloss Paint Formula

The following procedure is followed for forming the deep color semi-gloss paint formula: The mill container is mixed at high speed with pigment grinding blade capable of high shearing. Starting with water, add each ingredient in the listed order, allowing 5 minutes to mix between ingredients, then 30 minutes at the end to fully disperse pigments (Table 7). Following this, transfer ingredients to letdown container (Table 8), and continue to add the rest of the ingredients in order while stirring. Stir for 20 minutes before removing paint from the letdown. Let sit 30 minutes. Add 120 g of BASF CL yellow oxide colorant dispersion to paint and shake vigorously for 5 minutes. Allow to sit 5 minutes or more before testing.

TABLE 7

Mill composition.

| Mill | |
| --- | --- |
| Water | 55 g |
| Ammonia (29%) | 5 g |
| Aquaflow ™ NHS 310 (flow agent) | 14 g |
| Dow Tamol ™ 165A (dispersant) | 2 g |
| Huntsman Jeffsperse ® 3503 (dispersant) | 3 g |
| Silicone Defoamer | 1 g |
| Minex ® 4 (filler) | 50 g |
| Minex ® 10 (filler) | 50 g |
| Zinc Omadine ® (zinc pyrithione dispersion) | 2 g |
| Water | 85 g |

TABLE 8

Letdown composition

| Letdown | |
| --- | --- |
| Resin | 650 g |
| Silicone Defoamer | 0.5 g |
| Dow Acrysol ™ RM-895 (Rheology Modifier) | 2 g |
| Velate ™ 368 (coalescent) | 12 g |
| Proxel ® AQ (preservative) | 4 g |
| Dow Acrysol ™ RM-8W (rheology modifier) | 8 g |
| Colorant | 12 oz |

Incorporation of the siloxane-emulsified latex into the finished coating demonstrates increased burnish and mar resistance from the following testing methods:
1. Cheesecloth burnish ASTM 6736.
2. Concentrated abrasive cleaner burnish. A 7 mil drawdown is prepared on a black vinyl chart and cured for 7 days. The gloss is measured before and after burnish testing using a BYK Gardner gloss meter. A concentrated solution of an abrasive cleaner is applied to a sponge, placed inside a sponge holder, and ran for 30 cycles on a Gardner scrub abrasion tester. The panel is rinsed with water and left to dry before measuring gloss after burnish testing.

3. Denim Transfer/Burnish Resistance. A 7 mil drawdown is prepared on a black vinyl chart and cured for 7 days. A piece of denim is folded over itself and ran across the panel by hand with a consistent, even force for 30 cycles. The excess residue is wiped off the panel upon completion. The test is evaluated by visual appearance and factors such as scratching, gloss change, and color transfer.

4. Rubber Stopper Mar Resistance. A 7 mil drawdown is prepared on a black vinyl chart and cured for 7 days. A black rubber stopper is run across the panel by hand with a consistent, even force for 30 cycles. The excess residue is wiped off the panel upon completion. The test is evaluated by visual appearance and factors such as marring, gloss change, and color transfer.

5. Plastic Spoon Mar Resistance. A 7 mil drawdown is prepared on a black vinyl chart and cured for 7 days. The back of a plastic spoon is run across the panel by hand with a consistent, even force for 30 cycles. The excess residue is wiped off the panel upon completion. The test is evaluated by visual appearance and factors such as scratching and gloss change.

6. Nail Scratch Mar Resistance. A 7 mil drawdown is prepared on a black vinyl chart and cured for 7 days. The edge of the tester's nails is run across the panel with a consistent, even force for 30 cycles. The excess residue is wiped off the panel upon completion. The test is evaluated by visual appearance and factors such as scratching and gloss change.

TABLE 9

Film appearance and abrasive burnish test results by gloss measurement in white color flat paint formula.

| Sample | | Resin1 | Resin 1A | Resin 1B | Resin 1C |
|---|---|---|---|---|---|
| Film Appearance | | | | | |
| Orange Peel | | No | Slight | Yes | Yes |
| Fisheyes | | No | Slight | Yes | Yes |
| Abrasive Cleaner Burnish | | | | | |
| Initial Gloss | 20°/60°/85° | 1.7/5.3/4.1 | 1.8/6.1/3.6 | 1.6/6.9/4.1 | 1.7/6.1/4.0 |
| Gloss After Burnish | 20°/60°/85° | 2.0/6.0/6.3 | 2.1/6.8/4.1 | 1.8/7.5/4.8 | 2.0/6.8/4.7 |
| Gloss Change | 20°/60°/85° | 0.3/0.7/2.3 | 0.3/0.7/0.5 | 0.2/0.6/0.7 | 0.3/0.7/0.7 |

Resins 1A-C were found to have a much lower gloss change than Resin 1, which indicated that the addition of siloxane products showed a significant mar and burnish improvement. Relatively, the film appearance and burnish performance of Resin 1A was found to be better compared to 1B and 1C. Because of this, the Silmer® EP Di-50 was used in Resin 2 and 3, when studying the film defects referenced in Table 4, to produce Tables 10 and 11. A comparison between the different incorporation methods of the siloxane in order to achieve a usable polymer composition to obtain a defect-free film is shown below.

TABLE 10

Film appearance and burnish test results by gloss measurement in white color flat paint formula.

| Sample | | Resin 1 | Resin 2 | Resin 3 | Behr Control |
|---|---|---|---|---|---|
| Film Appearance | | | | | |
| Orange Peel | | No | Yes | Slight | No |
| Fisheyes | | No | Slight | No | No |
| Cheesecloth Burnish (ASTM 6736) | | | | | |
| Initial Gloss | 20°/60°/85° | 1.6/5.1/4.2 | 1.5/4.7/3.1 | 1.5/4.4/2.8 | 0.4/2.8/3.4 |
| Gloss After Burnish | 20°/60°/85° | 1.9/5.7/6.3 | 1.5/4.7/4.2 | 1.5/4.3/3.2 | 0.3/2.6/6.1 |
| Gloss Change | 20°/60°/85° | 0.3/0.6/2.1 | 0.0/0.0/1.1 | 0.0/0.1/0.4 | 0.1/0.2/2.7 |
| Abrasive Cleaner Burnish | | | | | |
| Initial Gloss | 20°/60°/85° | 1.7/5.3/4.1 | 1.5/4.8/3.2 | 1.5/4.1/2.8 | 0.4/2.9/3.6 |
| Gloss After Burnish | 20°/60°/85° | 2.0/6.0/6.4 | 1.5/4.8/4.2 | 1.4/4.1/3.2 | 0.4/2.8/4.7 |
| Gloss Change | 20°/60°/85° | 0.3/0.7/2.3 | 0.0/0.0/1.0 | 0.1/0.0/0.4 | 0.0/0.1/2.1 |

TABLE 11

Mechanical burnish and mar testing for white color flat paint formula. Visual score ranking 1-5, 5 being best.

| Sample | Resin 1 | Resin 2 | Resin 3 | Behr Control |
|---|---|---|---|---|
| Denim Burnish | | | | |
| Descriptive Observations | Blue color transfer and scratches | Light blue color transfer and no scratches | Light blue color transfer and no scratches | Blue color transfer and scratches |
| Visual Score 1-5 | 2 | 4 | 4 | 2 |
| Black Rubber Stopper Mar | | | | |
| Descriptive Observations | Severe black marks | Black marks | Light black marks | Severe black marks |
| Visual Score 1-5 | 1 | 3 | 4 | 2 |
| Plastic Spoon Mar | | | | |
| Descriptive Observations | Severe marking and scratching | Light scratching | Light scratching | Severe marking and scratching |
| Visual Score 1-5 | 1 | 4 | 4 | 1 |
| Nail Scratch Mar | | | | |
| Descriptive Observations | Severe marking and scratching | Little to no scratching | Little to no scratching | Severe marking and scratching |
| Visual Score 1-5 | 1 | 4 | 4 | 1 |

White flat formulas are helpful for tests such as denim burnish and black rubber stopper burnish, where color transfer to the paint can more easily be observed visually during evaluation. Based on the above results, Resin 3 appeared to have the best balance between burnish resistance and resin film appearance. This pre-emulsion incorporation method was determined to be optimal for this invention.

Deep color paints typically show poor burnish and mar resistance due to the contrast between the white scratching and the deep coloration. Given the above results in the white base paint formulas, the resins were then tested in deep color semi-gloss paint formulas. Testing was completed only with the pre-emulsion incorporation latex synthesis method. The other samples were omitted from testing due to less favorable results and surface defects.

TABLE 12

Film appearance and burnish test results by gloss measurement in a deep color semi-gloss paint formula.

| Sample | | Resin 1 | Resin 3 | Behr Control |
|---|---|---|---|---|
| Film Appearance | | | | |
| Orange Peel | | No | Slight | No |
| Fisheyes | | No | No | No |
| Cheesecloth Burnish (ASTM 6736) | | | | |
| Initial Gloss | 20°/60°/85° | 13.7/46.0/79.8 | 12.1/47.6/75.7 | 10.9/44.6/74.9 |
| After Burnish Gloss | 20°/60°/85° | 11.6/47.8/84.8 | 12.5/47.8/76.4 | 11.0/45.3/76.4 |
| Delta Gloss | 20°/60°/85° | 2.1/1.8/5.0 | 0.4/0.2/0.7 | 0.1/0.7/1.5 |
| Abrasive Cleaner Burnish | | | | |
| Initial Gloss | 20°/60°/85° | 13.9/46.2/79.6 | 12.5/47.6/77.3 | 11.0/44.6/73.9 |
| After Burnish Gloss | 20°/60°/85° | 7.4/36.9/76.4 | 8.1/39.7/76.5 | 7.4/35.5/50.1 |
| Delta Gloss | 20°/60°/85° | 6.5/9.3/3.2 | 4.4/7.9/0.8 | 3.6/9.1/23.8 |

TABLE 13

Mechanical burnish and mar testing for deep color semi-gloss paint formula. Visual score ranking 1-5, 5 being best.

| | Resin 1 | Resin 3 | Behr Control |
|---|---|---|---|
| Denim Burnish | | | |
| Descriptive Observations | Slight color transfer | No color transfer | Slight color transfer |
| Visual Score 1-5 | 3 | 5 | 3 |
| Rubber Stopper Mar | | | |
| Descriptive Observations | Black marking and scuffing | No black marks, light scuffing | Black marking and scuffing |
| Visual Score 1-5 | 2 | 4 | 2 |
| Plastic Spoon Mar | | | |
| Descriptive Observations | Severe white marking and scratching | Slight scratching, light white color | Severe white marking and scratching |
| Visual Score 1-5 | 1 | 3 | 1 |
| Nail ScratchMar | | | |
| Descriptive Observations | Severe white marking and scratching | Slight scratching, light white color | Severe white marking and scratching |
| Visual Score 1-5 | 1 | 3 | 1 |

The resin system made by adding siloxane into the monomer pre-emulsion showed the best film appearance among the various addition methods investigated. The burnish and mar performance, determined by gloss measurement, was superior for siloxane addition into the pre-emulsion. Visual evaluation from mechanical burnish and mar testing, by means of color transfer, scuffing, and scratching, demonstrated that the addition of siloxane into the monomer pre-emulsion is the most effective method of incorporating siloxane.

By the combination of the above effects, the resulting latex with siloxane is easily processable, clean, demonstrates self-defoaming capabilities, and improved burnish and mar resistance in final paint films for both white flat and semi-gloss deep paint formulations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   a) forming a pre-emulsion by combining a monomer composition with a siloxane-containing composition in water, the monomer composition including one or more monomers selected from the group consisting of (meth) acrylic acid monomers, (meth)acrylic monomers, vinyl functional monomers, and combinations thereof; and
   b) polymerizing the pre-emulsion by combining the pre-emulsion with a radical initiator in a reactor to form a reaction mixture that polymerizes into an emulsion polymer,
   wherein the siloxane-containing composition includes a siloxane having structure 1, 2, or 3:

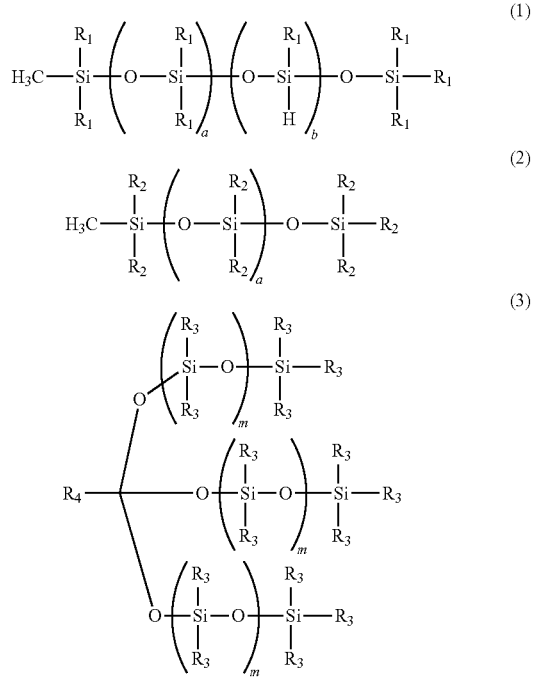

wherein:
a, b, and m are each independently 1 to 100;
$R_1$, $R_3$ are each independently $C_{1-10}$ alkyl, $C_{6-14}$ aryl, $C_{6-15}$ heteroaryl, $-NH_2$, $-R_4-OH$, $-R_4-NH_2$, epoxy group, vinyl group, hydrogen, or acrylate group;

$R_2$ is $C_{1-10}$ alkyl, $C_{6-14}$ aryl, $C_{6-15}$ heteroaryl, —$NH_2$, —$R_4$—OH, —$R_4$—$NH_2$, hydrogen, or acrylate group; and $R_4$ is a $C_{1-10}$ alkenylene group and wherein the siloxane having structure 1 or 3 is functionalized with amino, hydroxyl, epoxy, vinyl, or acrylate groups and the siloxane having structure 2 is functionalized with amino, hydroxyl, or acrylate groups.

2. The method of claim 1 wherein the vinyl functional monomers are selected from the group consisting of styrene, vinyl acetate monomers, vinyl ester monomers, and combinations thereof.

3. The method of claim 1 wherein the siloxane-containing composition includes siloxanes and polysiloxanes functionalized with amino, hydroxyl, epoxy, vinyl, or acrylate groups.

4. The method of claim 1 wherein $R_1$, $R_2$, $R_3$ are each independently methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, or allenyl groups.

5. The method of claim 1 wherein the siloxane-containing composition includes a compound having structure 4, 5, 6, 7, or 8:

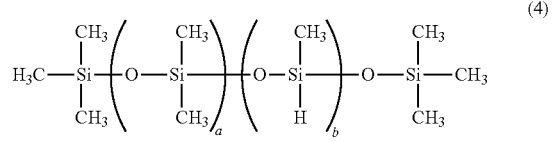
(4)

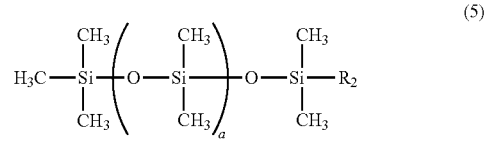
(5)

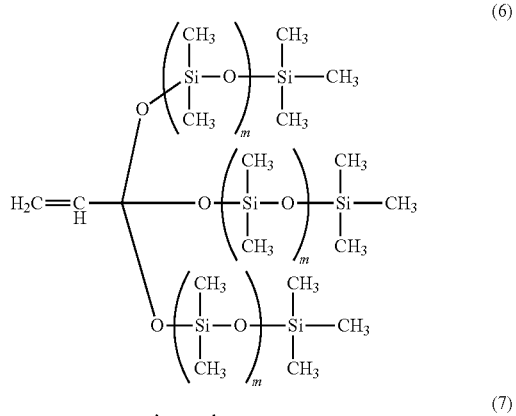
(6)

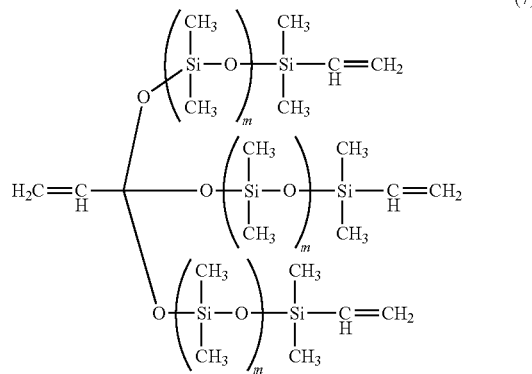
(7)

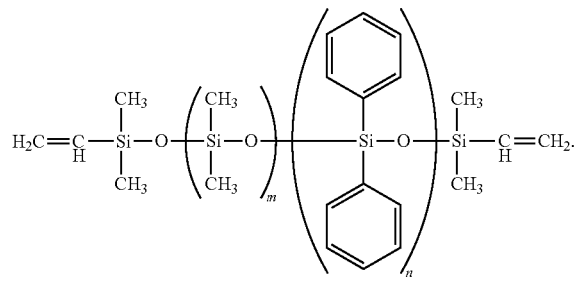
(8)

6. The method of claim 1 wherein the radical initiator is selected from the group consisting of organic peroxides, azo-compounds, metal iodides, metal alkyls, persulfates, and combination thereof.

7. The method of claim 1 wherein the monomer composition includes one or more monomers selected from the group consisting of acrylic acid, methacrylic acid, and combinations thereof.

8. The method of claim 1 wherein the monomer composition includes one or more monomers selected from the group consisting of methyl acrylate, methyl methacrylate, ethyl acrylate, ethyl methacrylate, butyl acrylate, butyl methacrylate, 2-ethylhexyl acrylate, decyl acrylate, lauryl methacrylate, methyl methacrylate, butyl methacrylate, stearyl methacrylate, isobornyl methacrylate, cyclohexyl methacrylate, isodecyl methacrylate, lauryl methacrylate, hydroxyethyl methacrylate, hydroxypropyl methacrylate, and combinations thereof.

9. The method of claim 1 wherein the monomer composition includes butyl acrylate, ethyl hexyl acrylate, methyl methacrylate, acrylic acid, and methacrylic acid.

10. The method of claim 1 wherein a final siloxane-containing resin emulsion is a composition that includes all of components that have been added to the reaction mixture such that the monomer composition is present in an amount from about 25 to 65 weight percent of the final siloxane-containing resin emulsion, the siloxane-containing composition is present in an amount from about 0.05 to 25 weight percent of the total weight of the final siloxane-containing resin emulsion, and the radical initiator is present in an amount from about 0.05 to 2 weight percent of the total weight of the final siloxane-containing resin emulsion, with the balance being water.

11. The method of claim 1 wherein the siloxane-containing composition includes a compound having structure 1:

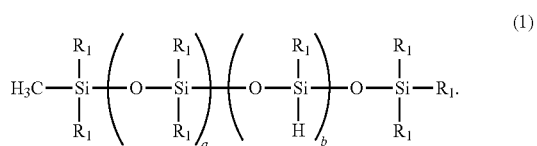
(1)

12. A method comprising:
a) forming a pre-emulsion by combining a monomer composition with a siloxane-containing composition in water, the monomer composition including one or more monomers selected from the group consisting of (meth)acrylic acid monomers, (meth)acrylic monomers, vinyl functional monomers, and combinations thereof; and b) polymerizing the pre-emulsion by combining the pre-emulsion with a radical initiator in a reactor to form a reaction mixture that polymerizes into an emulsion polymer, wherein the siloxane-containing composition includes a siloxane having structure 1, 2, or 3:

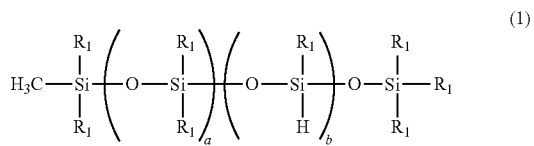
(1)

wherein:
a, b are each independently 1 to 100;
$R_1$ is $C_{1-10}$ alkyl, $C_{6-14}$ aryl, $C_{6-15}$ heteroaryl, $-NH_2$, $-R_4-OH$, $-R_4-NH_2$, epoxy group, vinyl group, hydrogen, or acrylate group; and
$R_4$ is a $C_{1-10}$ alkenylene group and wherein the siloxane is functionalized with amino, hydroxyl, epoxy, vinyl, or acrylate groups.

13. The method of claim 12 wherein the vinyl functional monomers are selected from the group consisting of styrene, vinyl acetate monomers, vinyl ester monomers, and combinations thereof.

14. The method of claim 12 wherein the siloxane-containing composition includes siloxanes and polysiloxanes functionalized with amino, hydroxyl, epoxy, vinyl, or acrylate groups.

15. The method of claim 12 wherein $R_1$, $R_2$, $R_3$ are each independently methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, or allenyl groups.

16. The method of claim 12 wherein the radical initiator is selected from the group consisting of organic peroxides, azo-compounds, metal iodides, metal alkyls, persulfates, and combination thereof.

17. The method of claim 12 wherein the monomer composition includes one or more monomers selected from the group consisting of acrylic acid, methacrylic acid, and combinations thereof.

18. The method of claim 12 wherein the monomer composition includes one or more monomers selected from the group consisting of methyl acrylate, methyl methacrylate, ethyl acrylate, ethyl methacrylate, butyl acrylate, butyl methacrylate, 2-ethylhexyl acrylate, decyl acrylate, lauryl methacrylate, methyl methacrylate, butyl methacrylate, stearyl methacrylate, isobornyl methacrylate, cyclohexyl methacrylate, isodecyl methacrylate, lauryl methacrylate, hydroxyethyl methacrylate, hydroxypropyl methacrylate, and combinations thereof.

19. The method of claim 12 wherein the monomer composition includes butyl acrylate, ethyl hexyl acrylate, methyl methacrylate, acrylic acid, and methacrylic acid.

20. The method of claim 12 wherein a final siloxane-containing resin emulsion is a composition that includes all of components that have been added to the reaction mixture such that the monomer composition is present in an amount from about 25 to 65 weight percent of the final siloxane-containing resin emulsion, the siloxane-containing composition is present in an amount from about 0.05 to 25 weight percent of the total weight of the final siloxane-containing resin emulsion, and the radical initiator is present in an amount from about 0.05 to 2 weight percent of the total weight of the final siloxane-containing resin emulsion, with the balance being water.

* * * * *